(12) United States Patent
Morio et al.

(10) Patent No.: US 9,657,794 B2
(45) Date of Patent: May 23, 2017

(54) COMPOSITE DISC ROTOR

(71) Applicant: AKEBONO BRAKE INDUSTRY CO., LTD., Tokyo (JP)

(72) Inventors: Takefumi Morio, Tokyo (JP); Shinjiro Masuko, Tokyo (JP); Takaaki Sasaki, Tokyo (JP); Tomoki Yachi, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 61 days.

(21) Appl. No.: 13/714,824

(22) Filed: Dec. 14, 2012

(65) Prior Publication Data
US 2013/0153344 A1    Jun. 20, 2013

(30) Foreign Application Priority Data

Dec. 16, 2011    (JP) ................. 2011-275527

(51) Int. Cl.
*F16D 65/12*    (2006.01)
*F16D 65/02*    (2006.01)

(52) U.S. Cl.
CPC ........... *F16D 65/123* (2013.01); *F16D 65/12* (2013.01); *F16D 2065/1316* (2013.01); *F16D 2065/1328* (2013.01); *F16D 2065/1392* (2013.01)

(58) Field of Classification Search
CPC ............. F16D 65/12; F16D 2065/1396; F16D 2065/1316; F16D 2065/1392;
(Continued)

(56) References Cited

U.S. PATENT DOCUMENTS 6,467,588 B1 * 10/2002 Baumgartner ........ F16D 65/123
188/218 XL
2002/0157908 A1    10/2002 Burgoon et al.
(Continued)

FOREIGN PATENT DOCUMENTS

CN    101666349 A    3/2010
CN    101815883 A    8/2010
(Continued)

OTHER PUBLICATIONS

A CN Office Action (with English-language translation) dated May 6, 2015 that issued in corresponding Chinese application No. 201210549967.6.
(Continued)

*Primary Examiner* — Xuan Lan Nguyen
(74) *Attorney, Agent, or Firm* — Drinker Biddle & Reath LLP

(57) ABSTRACT

A composite disc rotor includes a disc main body, a coupling bracket and coupling units. Each of the coupling units includes a bobbin, a clip and a coupling bolt. A head part of the bobbin includes a torque receiving portion inserted in the notch and a projection projected in a circumferential direction from an end of the torque receiving portion. A pipe part of the bobbin is extended from the head part and is fitted in a coupling through hole of the disc main body. The clip includes a connecting portion between the torque receiving portion and the notch and a pressing portion extended from the connecting portion between the head part and the coupling bracket. The coupling bolt is inserted into each of through hole of the bobbin to fix the coupling bracket to the coupling unit.

6 Claims, 17 Drawing Sheets

(58) Field of Classification Search
CPC ........... F16D 2065/1368; F16D 65/123; F16D 2065/1328; F16D 2065/1384; F16D 2065/1376; F16D 2065/134
See application file for complete search history.

(56) References Cited

U.S. PATENT DOCUMENTS

| | | | |
|---|---|---|---|
| 2004/0182660 A1* | 9/2004 | Cavagna et al. | 188/218 XL |
| 2007/0181388 A1* | 8/2007 | Schlitz et al. | 188/71.9 |
| 2008/0053719 A1* | 3/2008 | Yoshino et al. | 180/55 |
| 2008/0135351 A1* | 6/2008 | Kirschner et al. | 188/73.38 |
| 2010/0307875 A1* | 12/2010 | Ilg | F16D 65/12 188/218 XL |

FOREIGN PATENT DOCUMENTS

| | | |
|---|---|---|
| EP | 1013956 A2 | 6/2000 |
| EP | 1930617 A2 | 6/2008 |
| EP | 1970591 A1 | 9/2008 |
| JP | 2004-530848 A | 10/2004 |
| JP | 2006-528332 A | 12/2006 |
| WO | WO-03/001076 A1 | 1/2003 |
| WO | WO-2004102025 A1 | 11/2004 |

OTHER PUBLICATIONS

A JP Office Action (with English-language translation) dated Jun. 2, 2015 that issued in corresponding Japanese patent application No. 2011-275527.

* cited by examiner

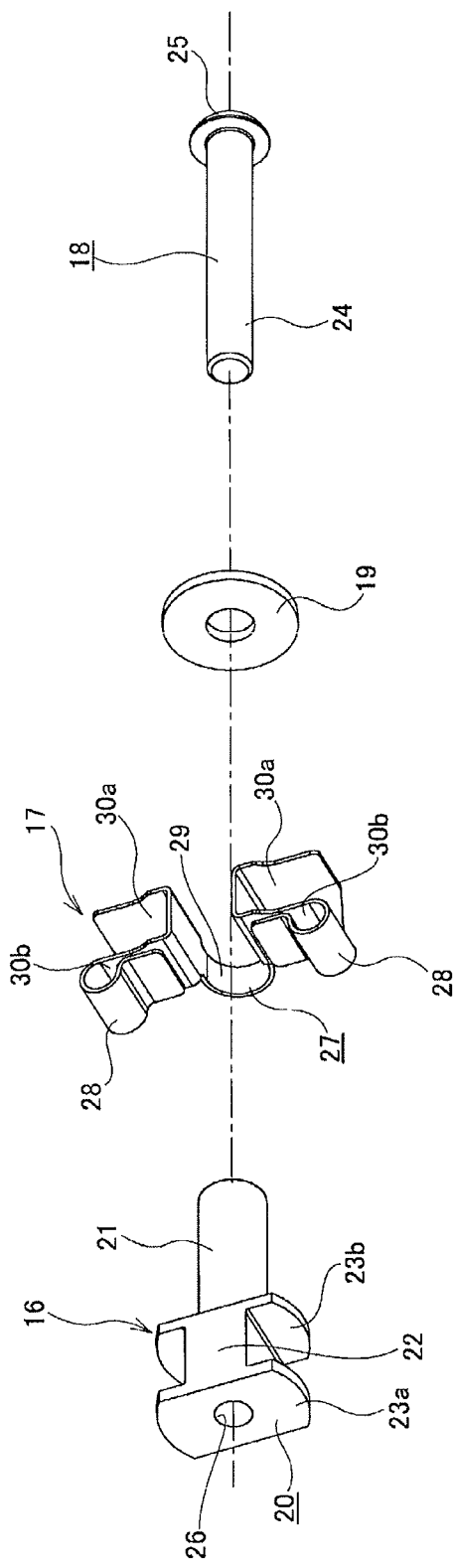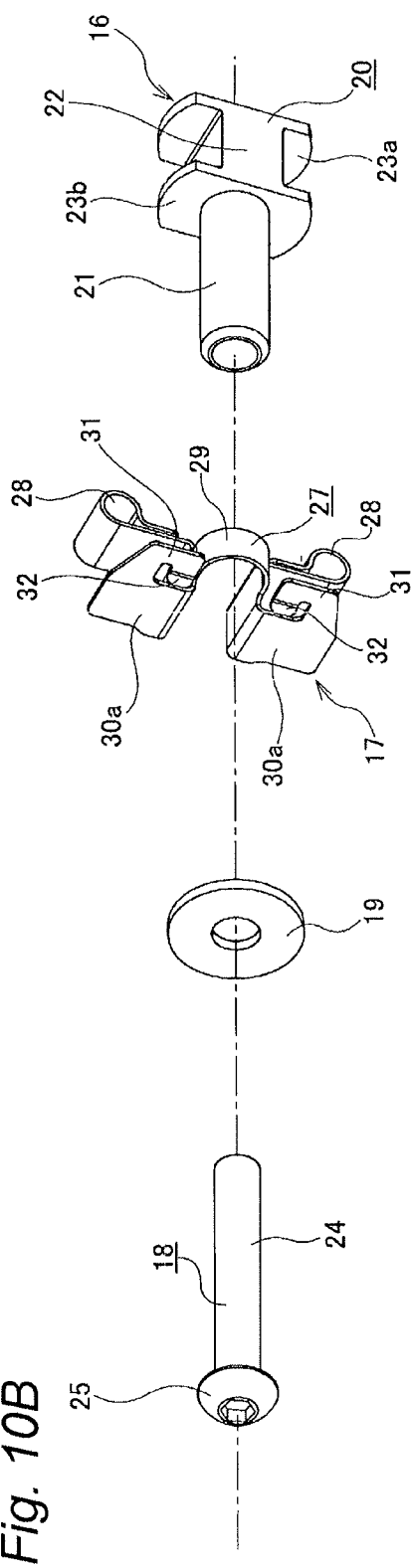

COMPOSITE DISC ROTOR

BACKGROUND

The invention is related to a composite disc rotor for a disc brake of a high-performance vehicle such as racing car and sports car. Specifically, the invention is related to a composite disc rotor capable of reducing a number of parts to thus reduce a cost while securing sufficient durability and reliability.

Since a high force is applied to a disc rotor, which is provided in a disc brake for braking a vehicle, upon braking, it is necessary to secure sufficient strength and rigidity, so that a weight thereof is apt to increase. On one hand, since the disc rotor is provided at a side closer to a road surface than a spring incorporated to a suspension, i.e., with the disc rotor performs as unspring weight, it is required to reduce the weight even if only slightly, for a ride quality or traveling stability. Therefore, a composite disc rotor has been known in which an inner peripheral edge part of a disc main body and an outer peripheral edge part of a coupling bracket referred to as a bell are connected by a plurality of sets of coupling units at a plurality of equally-spaced positions in a circumferential direction so that high brake torque which is applied upon braking can be transmitted (refer to Patent Documents 1 to 5). In addition, the circumferential direction in the present specification means a circumferential direction of the disc rotor, unless particularly mentioned. An axial direction in the specification means an axial direction of the disc rotor, unless particularly mentioned. A radial direction in the specification means a radial direction of the disc rotor, unless particularly mentioned.

In the composite disc rotor, the disc main body is made of a light material having sufficient wear resistance such as ceramic composite material or carbon composite material. Also, as disclosed in Patent Document 1, the disc main body may be formed of cast iron. In any case, entire shape of the disc main body is a circular ring shape, and both side surfaces thereof in the axial direction perform as a pair of friction surfaces to which pads are pushed upon the braking. In addition, the coupling bracket is made of a light alloy such as aluminum-based alloy, magnesium-based alloy and the like and, entire shape of the coupling bracket is a circular ring shape or a circular disc shape having a step portion which is provided at a central portion in the radial direction. The coupling bracket is coupled and fixed to a hub together with a wheel at an assembled state of the disc brake. The hub is a rotating-side bearing ring member consisting of a rolling bearing unit for wheel support. Also, each coupling unit couples the disc main body and the coupling bracket so that the brake torque can be transmitted therebetween and a difference of amounts of thermal expansion and contraction based on temperature changes can be absorbed.

The basic structure of the composite disc rotor is as described above. In the conventional structure disclosed in Patent Documents 1, 2 and 4, however, the number of parts is large, and the cost is increased. In the disc main body and the coupling bracket which are strongly coupled and fixed, the high force is applied to the respective coupling units in addition to the brake torque, due to a moment between the disc main body and the coupling bracket upon the braking. Therefore, it is thus difficult to secure the durability in the structure disclosed in Patent Document 3). Also, since a plate spring having a poor yield of the material thereof is used as the structure disclosed in Patent Document 5, the cost is increased.

[Patent Document 1] JP-A-2004-530848
[Patent Document 2] JP-A-2006-528332
[Patent Document 3] EP 1 013 956 B2
[Patent Document 4] EP 1 930 617 B1
[Patent Document 5] EP 1 970 591 B1

SUMMARY

It is therefore one advantageous aspect of the present invention to provide a composite disc rotor capable of securing sufficient durability and reliability and reducing the number of parts while suppressing the manufacturing costs of respective parts, thereby reducing the cost thereof.

According to one aspect of the invention, there is provided a composite disc rotor comprising:

a disc main body, having a ring shape, having a pair of friction surfaces which are opposite each other in an axial direction of the disc main body and to which pads are pushed upon braking, including a plurality of coupling portions at a plurality of circumferential positions of the disc main body, each of the coupling portions being disposed inner side in a radial direction of the disc main body and being formed with a coupling through hole;

a coupling bracket, having a plurality of notches which are opened in an outer peripheral edge of the coupling bracket and disposed at the plurality of circumferential positions; and a plurality of coupling units, disposed at the plurality of circumferential positions, and each of which includes a bobbin including a head part and a pipe part, a clip and a coupling bolt, wherein the head part includes a torque receiving portion inserted in each of the notches and a projection projected in a circumferential direction of the disc main body from an end of the torque receiving portion in the axial direction, the pipe part is extended from the head part and is fitted in the coupling through hole, each of the bobbins is formed with a through hole penetrating the head part and the pipe part, each of the clip includes a connecting portion between the torque receiving portion and a inner surface of each of the notches and a pressing portion extended from the connecting portion in the circumferential direction between the head part and the coupling bracket, and each of the coupling bolts is inserted into each of the through holes of the bobbins to fix the coupling bracket to the coupling unit, so that a torque applied to the friction surfaces is transmitted to the coupling bracket via the bobbin.

The pressing portion may include a spring portion provided between the projection and the coupling bracket so as to urge the projection away from the coupling bracket in the axial direction.

The composite disc rotor may be configured such that: the connection portion surrounds three sides of the torque receiving portion of each bobbin and has a folded-back shape, at least two pressing portions are extended from opposed positions of the connection portion, which are bent from at least one edge of the connection portion to an opposite side to the torque receiving portion, and a part of each of the pressing portions is contacted to both circumferential side portions of each of the notches The composite disc rotor may be configured such that: the spring portions are formed by folding back tip half parts of a pair of the pressing portions which are extended from an edge of the connection portion at a side of the head part in the axial direction, toward the head part, and the spring portions are held between the head part and the pressing portions with being elastically compressed in the axial direction.

The composite disc rotor may be configured such that: the respective pressing portions are extended from four positions of the connecting portion, two of the four positions are the opposed positions of the connection portion in the edge thereof at the side of the head part in the axial direction, the other two of the four positions are opposed positions of the connection portion in an opposite edge thereof at an opposite side of the head part, and the respective pressing portions interpose both circumferential sides of each notch of the coupling bracket from both axial sides.

The composite disc rotor may be configured such that: the respective pressing portions are extended from two positions of the connecting portion, the two positions are the opposed positions of the connection portion in the edge thereof at the side of the head part in the axial direction, and both the pressing portions are contacted to one axial surface of both circumferential sides of each notch.

The composite disc rotor may be configured such that: the pressing portion is extended from an edge of the connection portion at a side of the head part in the axial direction, an extension part is extended inward in the radial direction from the pressing portion, and the extension part includes an engaging part which is engaged with an inner end portion of the head part in the radial direction so as to restrict a displacement of the clip outward in the radial direction.

The composite disc rotor may be configured such that: at least a part of an inner surface of each of the through holes of the bobbins is formed with female screw, and each of the coupling bolts is screwed with the female screw.

The composite disc rotor may be configured such that each of the clips is integrally formed of a metal sheet having a resilience and corrosion resistance.

BRIEF DESCRIPTION OF DRAWINGS

FIG. 10A is a perspective view of constitutional parts of a coupling unit of the composite disc rotor shown in FIG. 1 seen from the inner side, and FIG. 10B is a perspective view seen from the outer side.

FIG. 8C is an orthographic view of the clip seen from the outer side and FIG. 8D is an orthographic view of the clip seen from the circumferential direction.

DETAILED DESCRIPTION OF EXEMPLIFIED EMBODIMENTS

Figure 1:
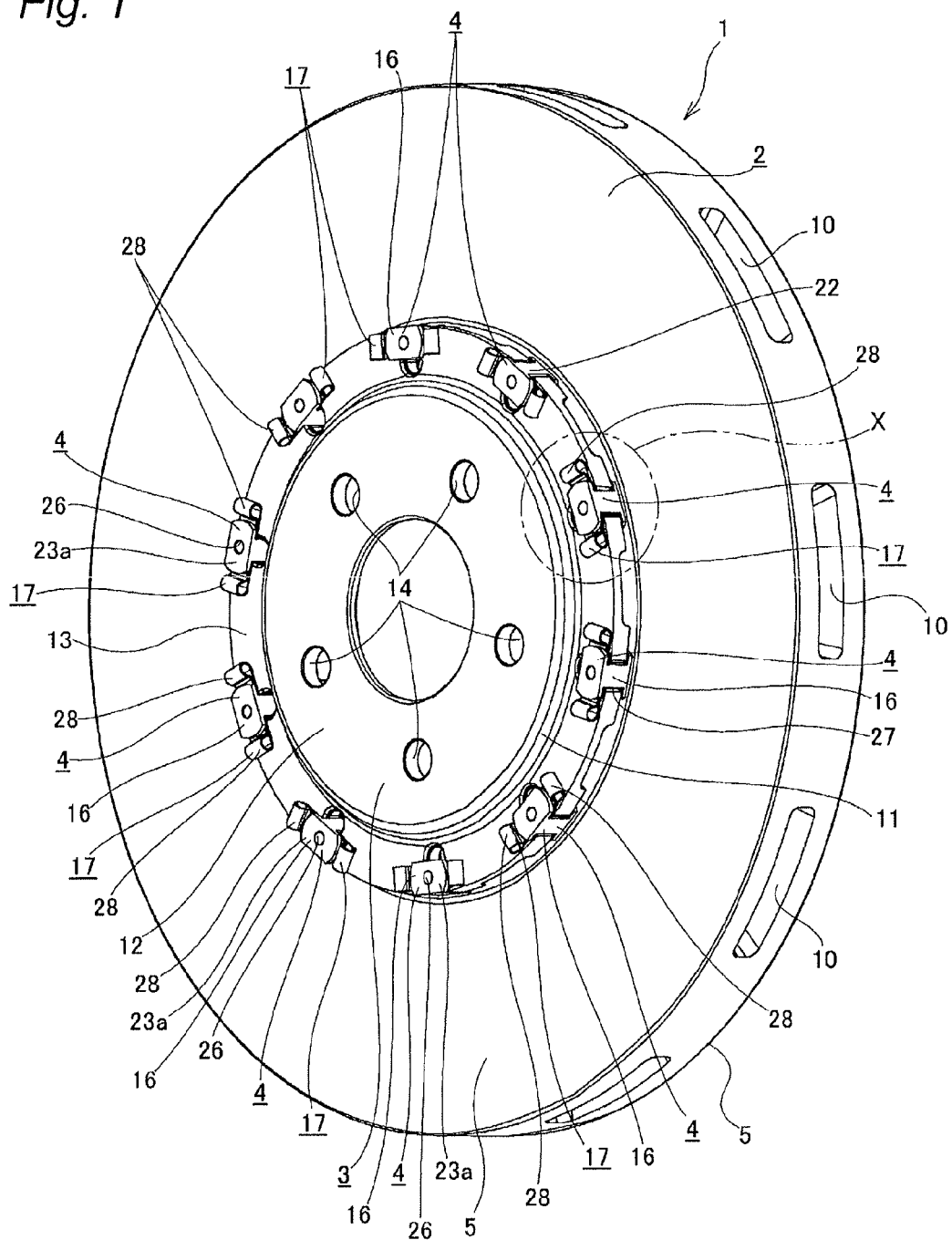
FIG. 1 is a perspective view showing a composite disc rotor according to a first embodiment of the invention, which is seen from an inner side at an assembled state.
Figure 2:
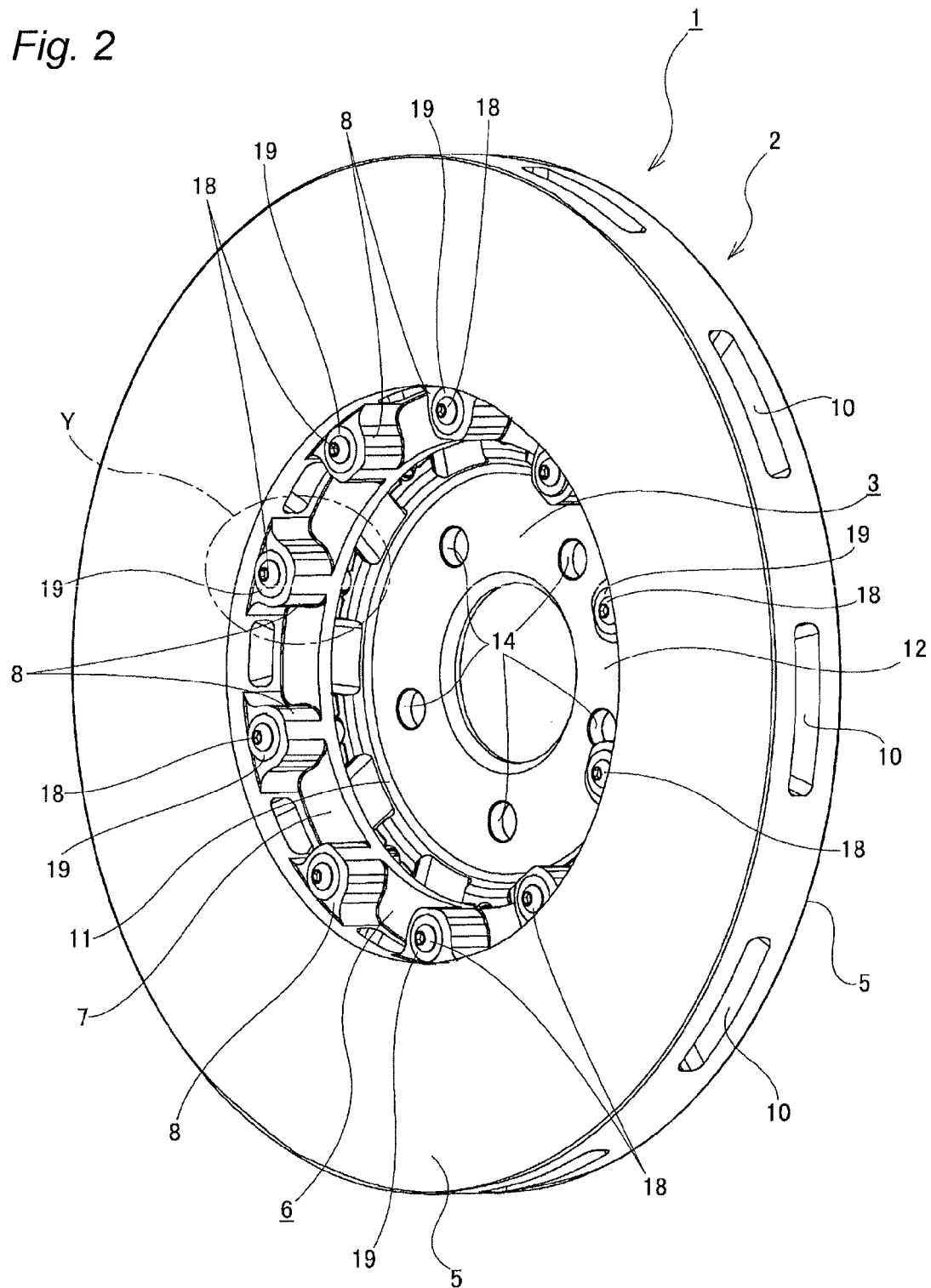
FIG. 2 is a perspective view showing the composite disc rotor shown in FIG. 1, which is seen from an outer side at the assembled state.
Figure 3:
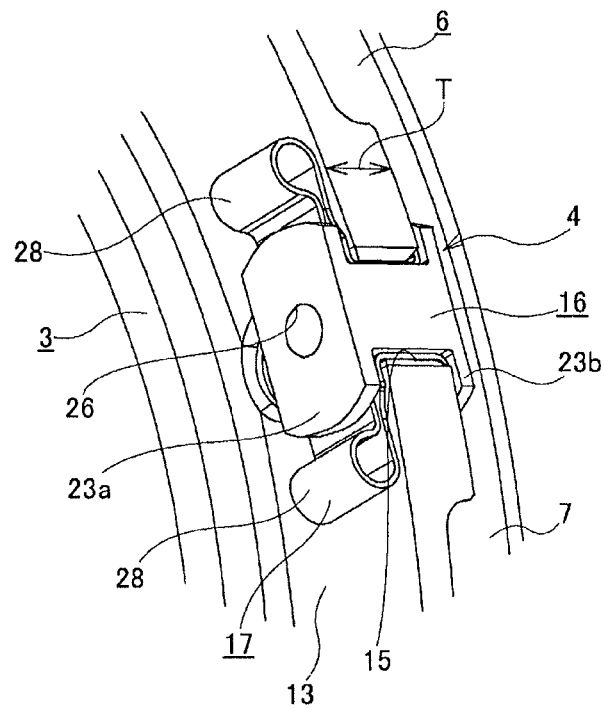
FIG. 3 is an enlarged view of an X part in FIG. 1.
Figure 4:
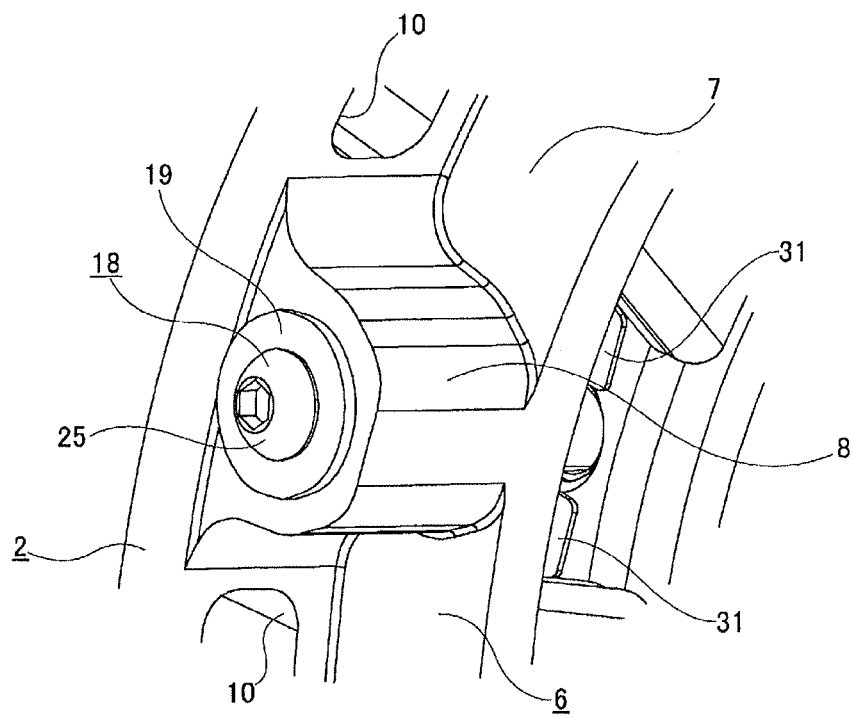
FIG. 4 is an enlarged view of a Y part in FIG. 2.
Figure 5:
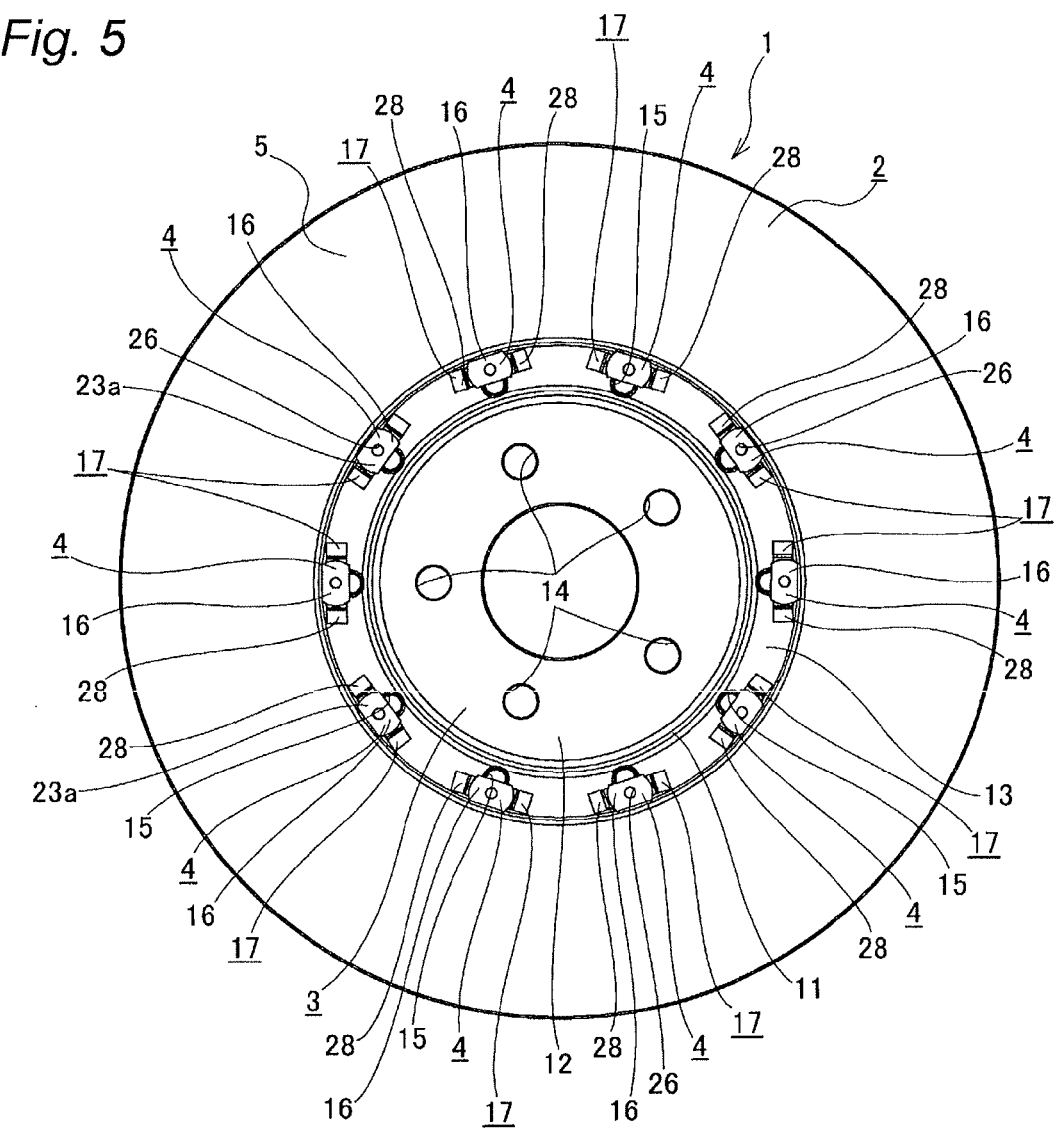
FIG. 5 is an orthographic view seen from the inner side at the assembled state.
Figure 6:
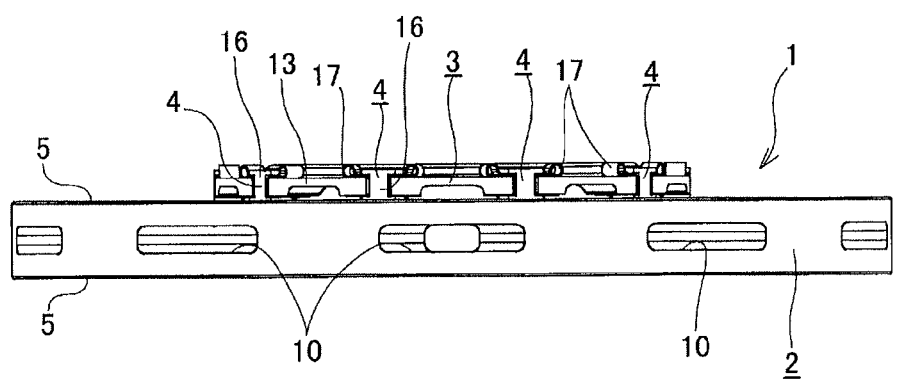
FIG. 6 is an orthographic view of the composite disc rotor shown in FIG. 1 seen from a radial direction at the assembled state.
Figure 7:
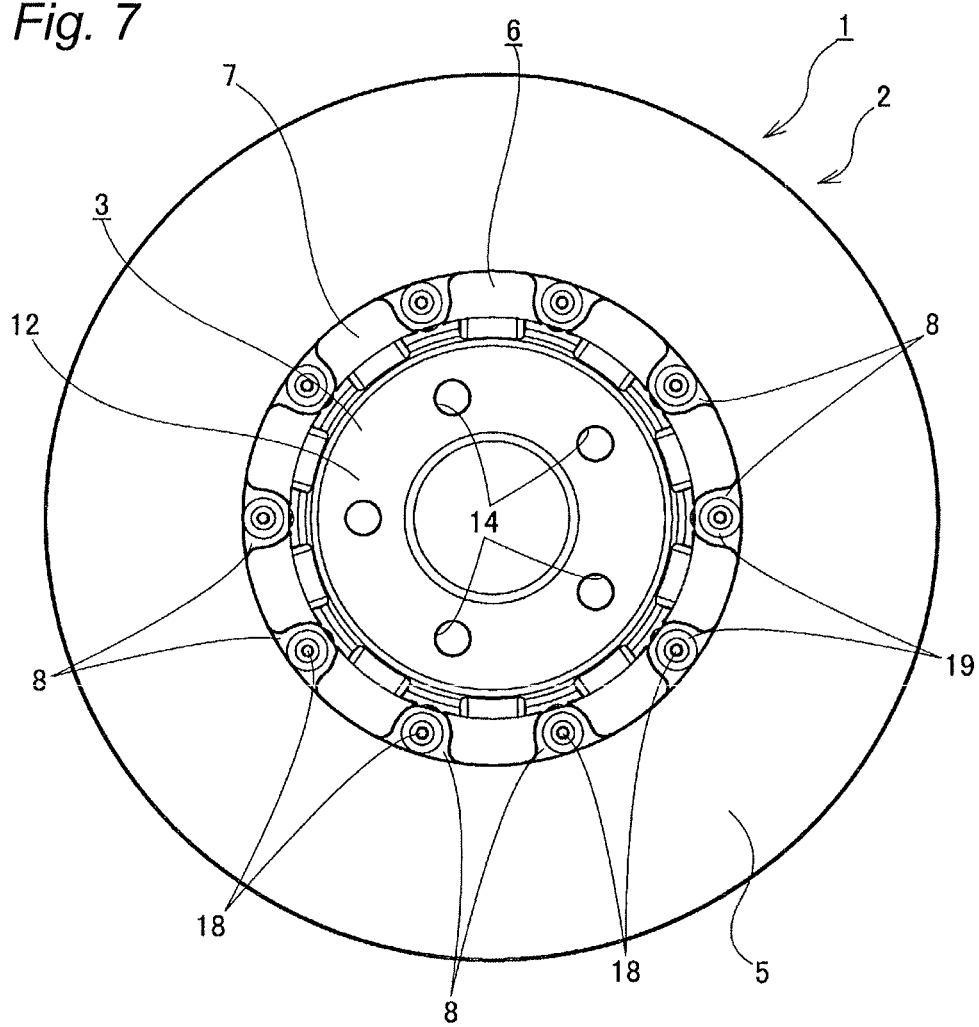
FIG. 7 is an othographic view of the composite disc rotor shown in FIG. 1 seen from the outer side at the assembled state.
Figure 8:
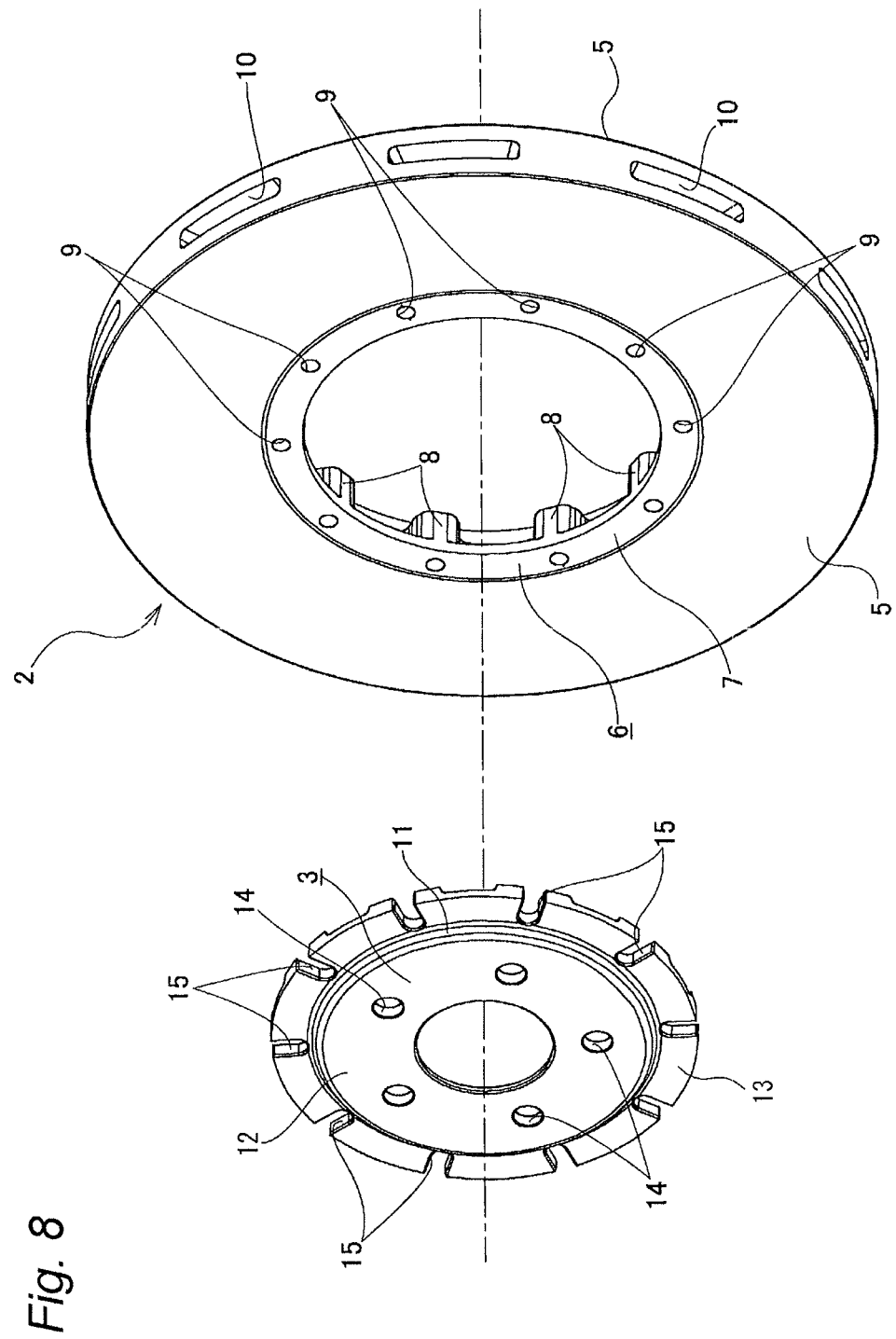
FIG. 8 is a perspective view of the composite disc rotor shown in FIG. 1 seen from the inner side at a state where a disc main body and an attachment plate part are separated.
Figure 9:
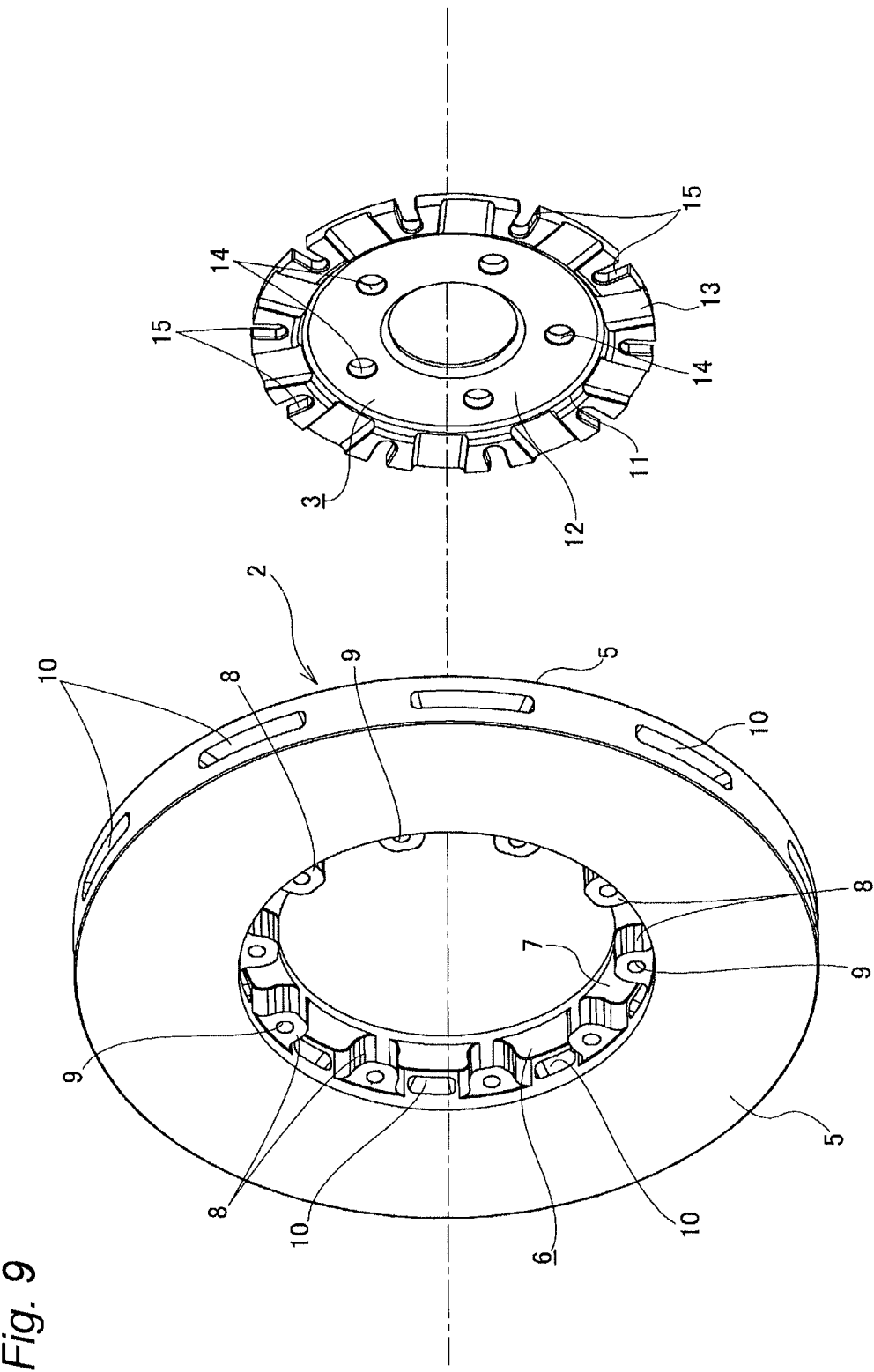
FIG. 9 is a perspective view of the composite disc rotor shown in FIG. 1 seen from the outer side at the state where the disc main body and the attachment plate part are separated.
Figure 11:
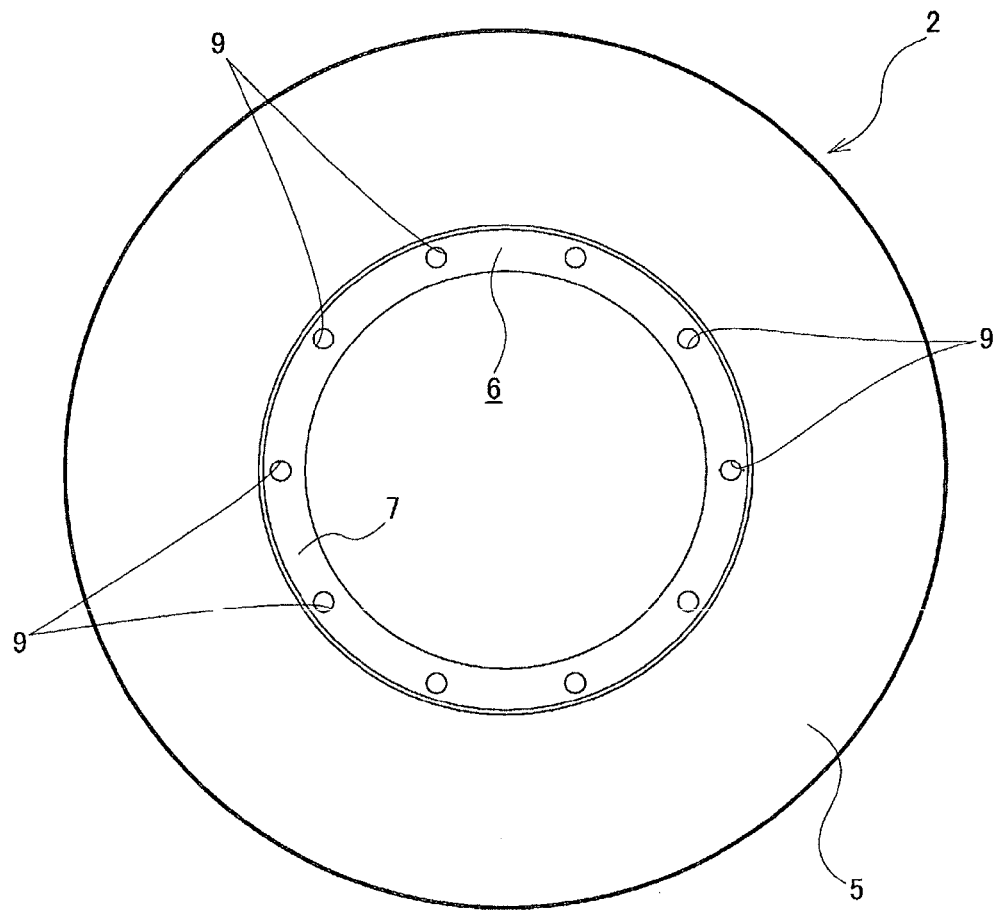
FIG. 11 is an orthographic view of the disc main body that is taken out, which is seen from the inner side.
Figure 12:
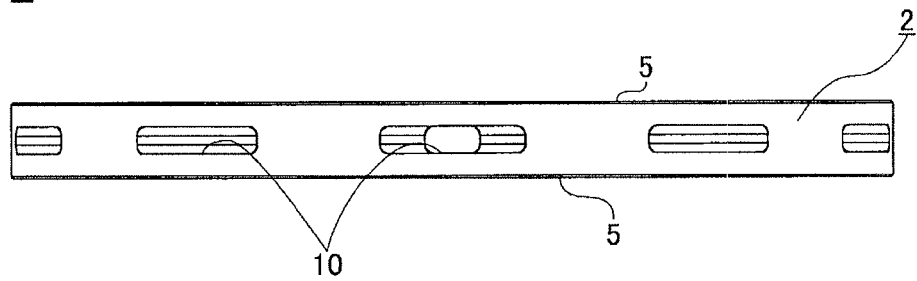
FIG. 12 is an orthographic view of the disc main body that is taken out, which is seen from the radial direction.
Figure 13:
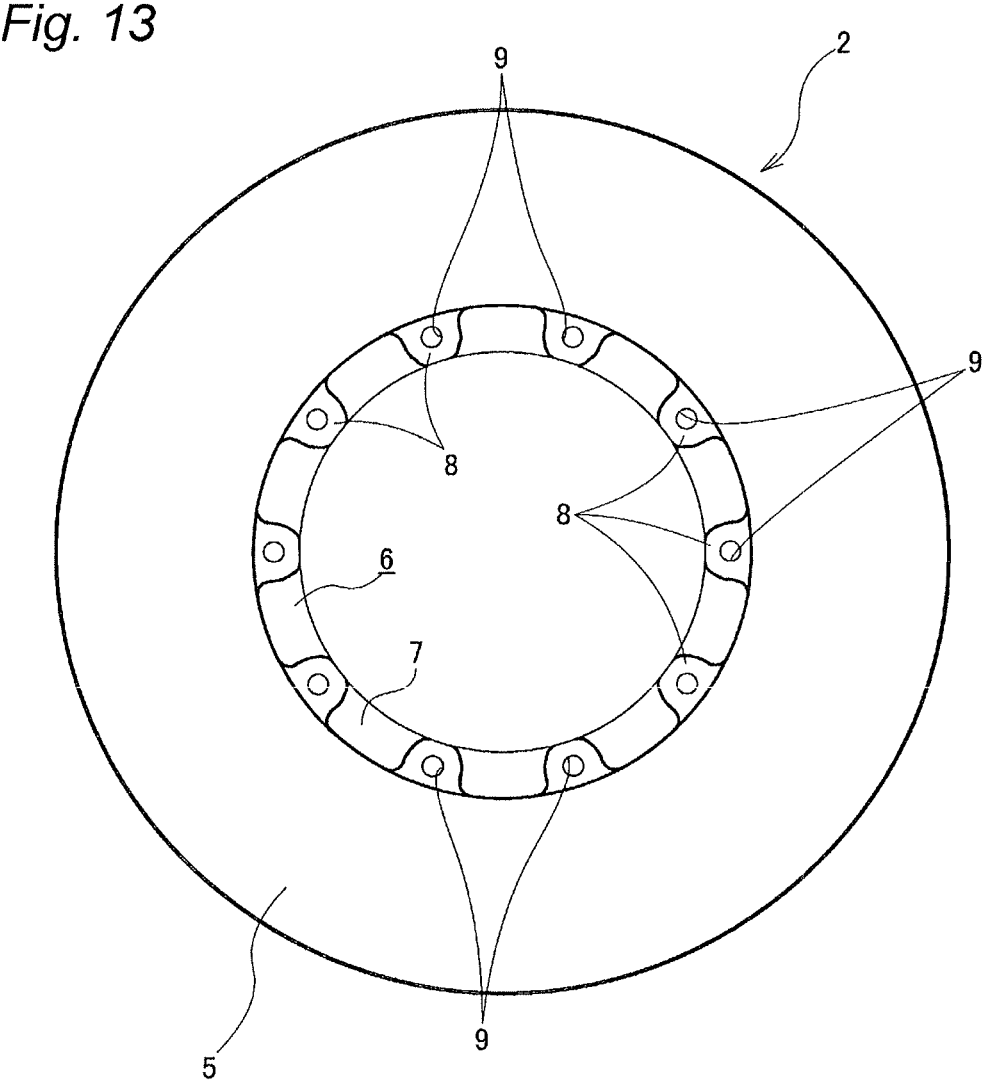
FIG. 13 is an orthographic view of the disc main body that is taken out, which is seen from the outer side.
Figure 14:
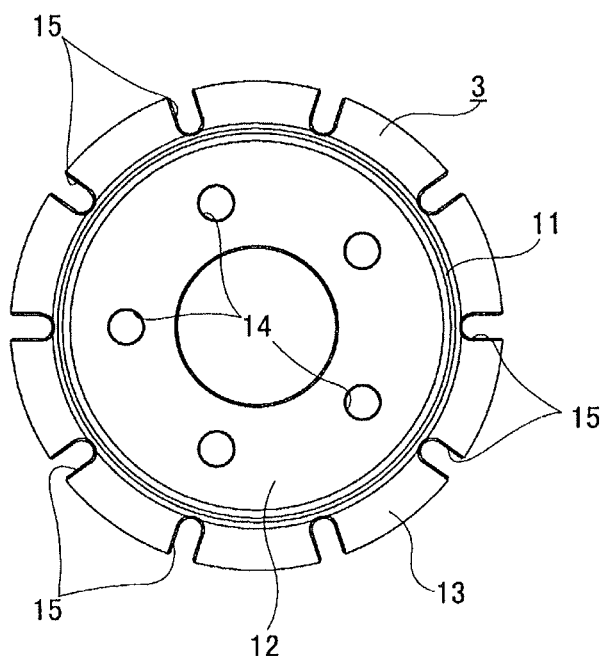
FIG. 14 is an orthographic view of a coupling bracket of the composite disc rotor shown in FIG. 1 that is taken out, which is seen from the inner side.
Figure 15:
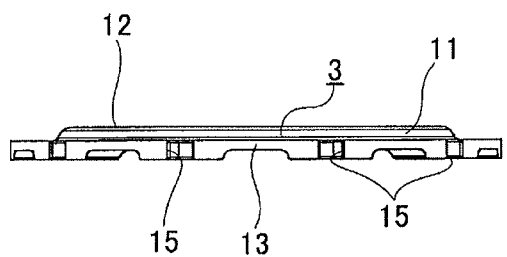
FIG. 15 is an orthographic view of the coupling bracket that is taken out, which is seen from a radial direction.
Figure 16:
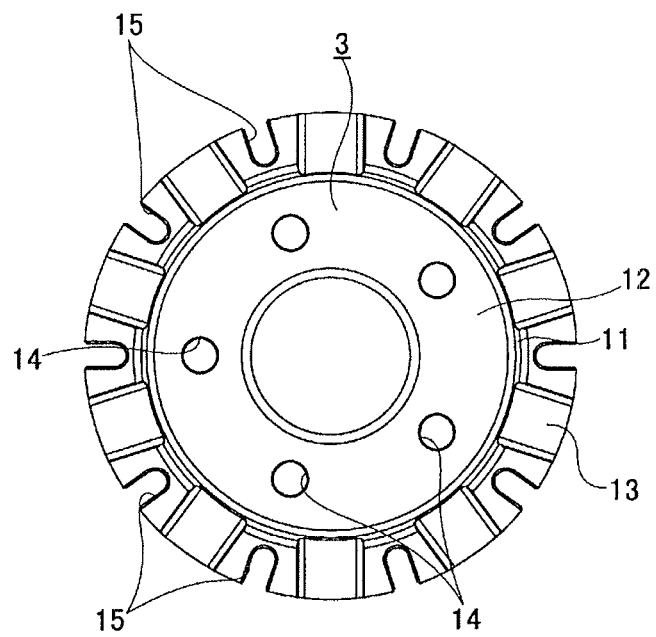
FIG. 16 is an orthographic view of the coupling bracket that is taken out, which is seen from the outer side.
Figure 17A:
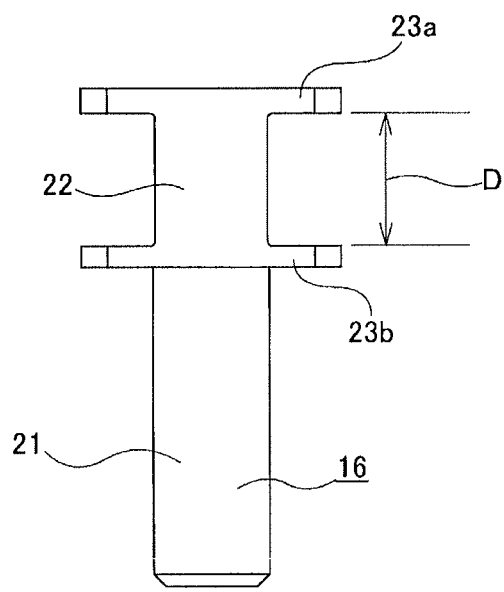
FIG. 17A is an orthographic view of a bobbin of the composite disc rotor shown in FIG. 1 seen from the radial direction.
Figure 17B:
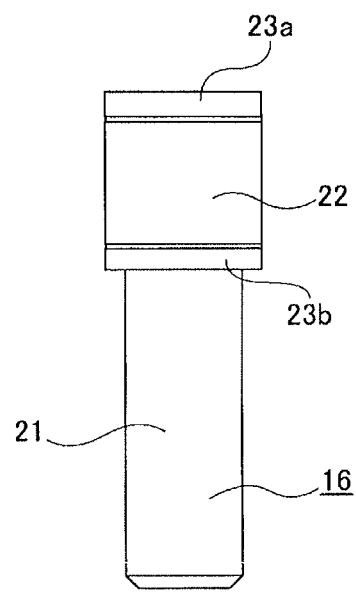
FIG. 17B is an orthographic view of the bobbin seen from the circumferential direction.
Figure 17C:
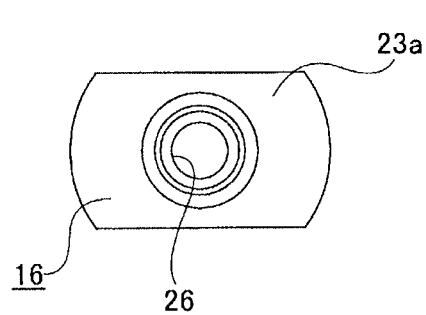
FIG. 17C is an orthographic view of the bobbin seen from the outer side and FIG. 17D is an orthographic view of the bobbin seen from the inner side.
Figure 17D:
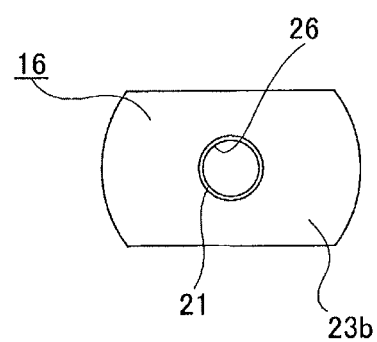
Figure 18A:
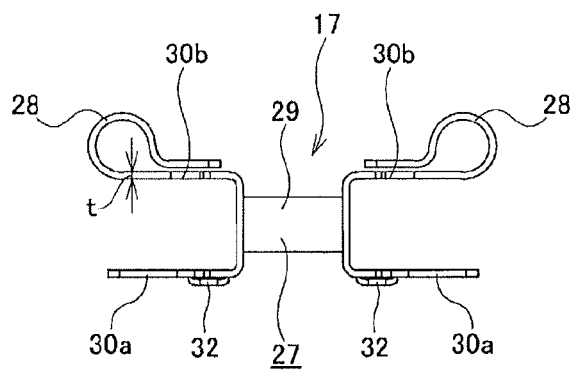
FIG. 18A is an orthographic view of a clip of the composite disc rotor shown in FIG. 1 seen from the radially outer side.
Figure 18B:
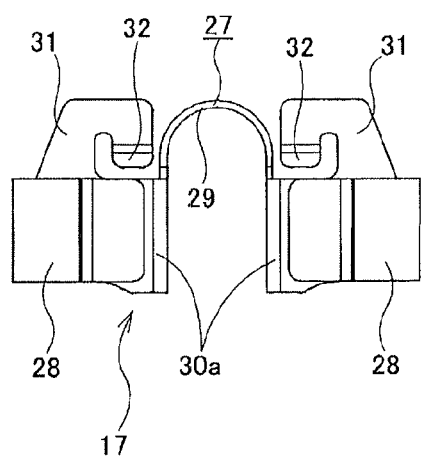
FIG. 18B is an orthographic view of the clip seen from the inner side.
Figure 18C:
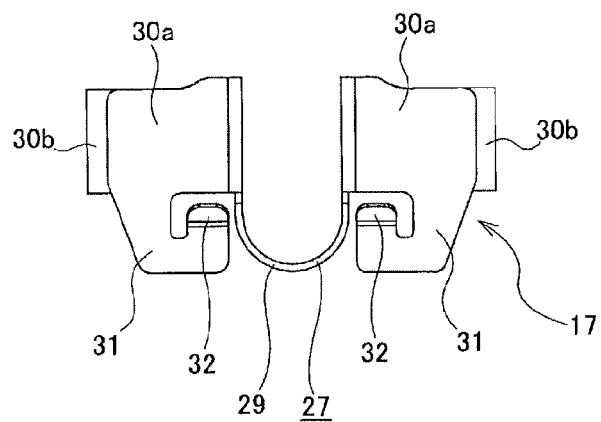
Figure 18D:
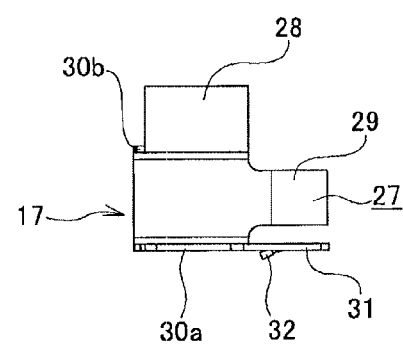

FIGS. 1 to 18 show a first embodiment of the invention. A composite disc rotor 1 of this embodiment has a disc main body 2, a coupling bracket 3 and a plurality of sets of coupling units 4.

An entire shape of the disc main body 2 is a circular ring shape. The disc main body 2 is formed by a light material having sufficient strength, rigidity and wear resistance such as ceramic composite and carbon composite. Both side surfaces of the disc main body 2 in an axial direction perform as a pair of friction surfaces 5 to which pads are pushed upon braking. Also, a coupling part 6 is provided at an inner peripheral edge of the disc main body 2 so that it more extends in a radially inner side than the friction surfaces 5. The coupling part 6 has a flange part 7 and thick parts 8 (coupling portions). The flange part 7 has an inward flange shape and is formed to continue over a whole circumference at an inner side part of an inner periphery of the disc main body 2. Her, the inner side is a central side in a width direction of a vehicle with being mounted to the vehicle. Also, the respective thick parts 8 are formed at a plurality of equally-spaced positions in a circumferential direction (a plurality of circumferential positions) so that each thick part continues to an outer side surface of the flange part 7 in the width direction and the inner periphery of the disc main body 2. In the present embodiment, the thick parts are formed at 10 positions. The respective thick parts 8 are formed with coupling holes 9 at central portions thereof so that the respective coupling holes penetrate the thick parts 8 in an axial direction of the disc main body 2. Also, in the present embodiment, ventilation slots 10 through which both inner and outer circumferential surfaces of the disc main body 2 communicate with each other are formed at parts of the disc main body 2 between the respective thick parts 8 in the circumferential direction. Thereby, the composite disc rotor 1 is a ventilated disc.

Also, an entire shape of the coupling bracket 3 is a circular ring shape. The coupling bracket 3 is formed by performing the forging and necessary cutting operations for a light alloy material such as aluminum-based alloy and magnesium-based alloy. An outer diameter of the coupling bracket 3 is slightly smaller than an inner diameter of the part of the disc main body 2 where the friction surfaces 5 are formed, and is sufficiently larger than a diameter of an inscribed circle of the respective thick parts 8 of the flange part 7. Also, the coupling bracket 3 is formed with a step part 11 at its radially central portion, and includes an attachment plate part 12 that is positioned at an inner diameter-side than the step part 11 and a coupling plate part 13 that is positioned at an outer diameter-side than the step part 11. The attachment plate part 12 is formed with attachment holes 14 at a plurality of circumferentially equally-spaced positions in a radially central portion thereof. The attachment holes 14 are formed at five positions in the present embodiment. Bolts or studs (not shown) are inserted into the attachment holes 14 to couple and fix the composite disc rotor 1 to a rotating-side flange of a rolling bearing unit of a wheel support. Also, the coupling plate part 13 is formed with notches 15 at a plurality of circumferentially equally-spaced positions thereof. Each of the notches 15 is opened to an outer peripheral edge of the coupling bracket 3. The notches 15 are formed at 10 positions in the present embodiment. The number of the notches 15 is the same as that of the coupling holes 9. Also, the respective coupling holes 9 are located at substantially central positions of the respective notches 15 in the radial direction at a state where the disc main body 2 and the coupling bracket 2 are concentrically combined. In other words, the notched 15 are positioned at the plurality of circumferential positions of the thick parts 8. That is, the respective coupling holes 9 are matched with the respective notches 15 at a state where the disc main body 2 and the coupling bracket 2 are combined. In this embodiment, a thickness of the parts of the coupling plate part 13 where the respective notches 15 are formed is made to be larger than the other parts circumferentially spaced from the parts, thereby securing the compatibility between the lightweight object and the necessary strength and rigidity.

In the composite disc rotor 1, the respective coupling units 4 are placed between the respective thick parts 8. In other words, the respective coupling parts 4 are placed between the respective notches 15. Thereby, the disc main body 2 and the coupling bracket 3 are combined so that the brake torque can be transmitted therebetween and the slight oscillating displacement can be made in a direction along which central axes thereof can be deviated.

Each of the coupling units 4 includes a bobbin 16, a clip 17, a coupling bolt 18. Further, a washer 19 through which the coupling bolt 18 is inserted is provided for each of the coupling units 4.

The bobbin 16 is formed by performing the cutting operation for a metal material having sufficient strength and rigidity such as iron-based alloy, for example carbon steel, high-speed tool steel and stainless steel. The bobbin includes a head part 20 and a pipe part 21 in order from an axially inner side. A cross sectional shape of the head part 20 in the axial direction of the disc rotor 2 has a rounded rectangular shape. The head part 20 includes a torque receiving portion 22 and a pair of projections 23a, 23b each of which having an outward flange shape. A width size of the torque receiving portion 22 is the same as or slightly smaller than a width size of each of the notches 15 formed at the coupling bracket 3. Therefore, the torque receiving portion 22 can be inserted into each notch 15 from the outer peripheral edge-side opening. After the torque receiving portion 22 is inserted, it does not rattle. Also, the projections 23a, 23b are formed to protrude from both axial end portions of the torque receiving portion 22 in both circumferential directions. An interval D (refer to FIG. 17) between the projections 23a, 23b is slightly larger than a size that is obtained by summing a thickness T (refer to FIG. 3) of the part of the coupling bracket 3 where each of the notches 15 are formed and two times of a thickness t (refer to FIG. 18) of a metal plate configuring the clip 17 (D>T+2t). Also, the pipe part 21 can be fitted into each coupling hole 9 formed at each of the thick portions 8 of the coupling part 6 of the disc main body 2 so as not to be ratted. Also, an inner diameter of the pipe part 21 is slightly larger than an outer diameter (screw thread diameter) of a screw rod part 24 of the coupling bolt 18 and is sufficiently smaller than a diameter of a head part 25 of the coupling bolt 18. Also, a central portion of the torque receiving portion 22 is formed with a screw hole 26 into which the screw rod part 24 is screw-engaged and which is concentric with an inner periphery of the pipe part 21. The coupling hole 9 penetrates the head part 25 and the pipe part 21. In addition, the coupling hole may be formed as a hole without being formed with the screw rod part 24, and the coupling bolt 18 may be screwed with a nut (not shown).

Also, the clip 17 is integrally made by a stainless spring steel plate having elasticity and corrosion resistance. The clip 17 includes a spacer portion 27 and a pair of spring parts 28. The spacer portion 27 has a connection portion 29 and four pressing portions 30b at a part held between the head part 20 of the bobbin 16 and an inner surface and a peripheral part of each notch 15. The connection portion 29 is formed by folding back the spring steel plate into a U shape. The connection portion 29 surrounds three sides, which are radially inner side and both circumferential sides, of the torque receiving portion 22 of the bobbin 16, except for a radially outer side. Also, the respective pressing portions 30b are formed by bending the opposed parts of the connection portion 29 from both axial edges thereof in an opposite side to the torque receiving portion 22 and are provided in a pair for each of the opposed parts. An interval between the respective pressing portions 30b at a free state of the clip 17 is the same as or slightly smaller than the thickness T of the part of the coupling bracket 3 where the notches 15 are formed. Therefore, the respective pressing portions 30b elastically interpose both circumferential sides of the part of the coupling bracket 3 where the notches 15 are formed from both axial sides.

In addition, both the spring parts 28 are formed by folding back tip half parts of the pressing portions 30b, 30b of the respective pressing portions 30b, which are positioned at an opposite side (inner side) to the pipe part 21, toward the head part 20 (toward the inner side). In this embodiment, the spring parts 28 have a central portion that is bent into a substantially partially cylindrical shape and a flat tip, respectively, and are opposed to the pressing portions 30b, 30b at a slight gap therebetween. Like this, the spring parts 28 are held with being axially elastically compressed between the projection 23a of the head part 20 and both the pressing plates 30b at an assembled state of the composite disc rotor 1. An axial elastic force is applied between the projection 23a and the coupling bracket 3 having the bobbin 16 coupled and fixed thereto.

Also, in this embodiment, the pressing portions 30a of the respective pressing portions 30b, which are positioned at the pipe part 21-side (outer side). The pressing portions 30a are provided with extension parts 31 extended therefrom in the radial direction to a more inner side than the head part 20. Tips of the respective extension parts 31 are formed with engaging parts 32 that are engaged with radially inner end edges of the outer-side flange part 23b. Thus, the clip 17 is prevented from being displaced in the radially outer direction in each notch 15, irrespective of the centrifugal force that is applied when the composite disc rotor 1 rotates.

The respective bobbins 16 are coupled and fixed to the disc main body 2 by the respective coupling bolts 18 and the coupling bracket 3 is elastically supported to the head parts 20 of the respective bobbins 16 by the respective clips 17. In a state where the respective coupling bolts 18 are inserted into the coupling holes 9 of the coupling part 6 of the disc main body 2 from the outer side to the inner side, the respective tips thereof are screw-engaged and further tightened into the screw holes 26, 26 of the respective bobbins 16. Thereby, the respective bobbins 16 are coupled and fixed to the disc main body 2. The respective bobbins 16 and the respective clips 17, 17 are engaged into the notches 15 of the coupling bracket 3 before the respective bobbins 16 are coupled and fixed to the disc main body 2. Therefore, at a state where the respective bobbins 16 are coupled and fixed to the disc main body 2, the disc main body 2 and the coupling bracket 3 are coupled so that the torque can be transmitted therebetween through the respective coupling units 4 and they can be slightly relatively displaced.

Since the composite disc rotor 1 of this embodiment is configured and assembled as described above, it is possible to secure the sufficient durability and reliability and to reduce the number of parts while suppressing the manufacturing costs of the respective parts, thereby reducing the cost thereof.

That is, according to the composite disc rotor 1 of the present embodiment, the torque receiving portions 22 of the bobbins 16 of the respective coupling units 4 and the respective notches 15 are coupled, so that it is possible to transmit the sufficiently high torque between the disc main body 2 and the coupling bracket 3. Also, each of the coupling units 4 has a gap corresponding to a difference (D−T−2t) between the interval D between the projections 23a, 23b and the sum of the thickness T of the part of the coupling bracket 3 forming each notch 15 and two times of the thickness t of the metal plate configuring the clip 17. When the moment in the direction of inclining the central axes of both the disc main body 2 and the coupling bracket 3 is applied therebetween, both the disc main body 2 and the coupling bracket 3 are relatively displaced while elastically deforming the spring parts 28 of the clips 17 provided in the respective coupling units 4. Hence, it is possible to prevent the excessive force from being applied to the respective coupling units 4 by the moment that is applied upon the braking. As a result, it is possible to secure the reliability and durability of the composite disc rotor 1 having the respective coupling units 4 incorporated thereto. Also, at a normal state, the coupling part between both the disc main body 2 and the coupling bracket 3 does not rattle due to the elastic force of the respective spring parts 28.

Also, according to the composite disc rotor 1 of this embodiment, the respective coupling units 4 do not have a part whose material yield is poor and manufacturing cost is high, such as the circular ring-shaped plate spring disclosed in Patent Document 5. Also, since the respective clips 17, 17 are provided with the spacer portions 27 and the spring parts 28, it is possible to reduce the number of parts and to thus reduce the cost, which results from the easiness of the part manufacturing, the part management and the assembling operation.

Figure 19A:
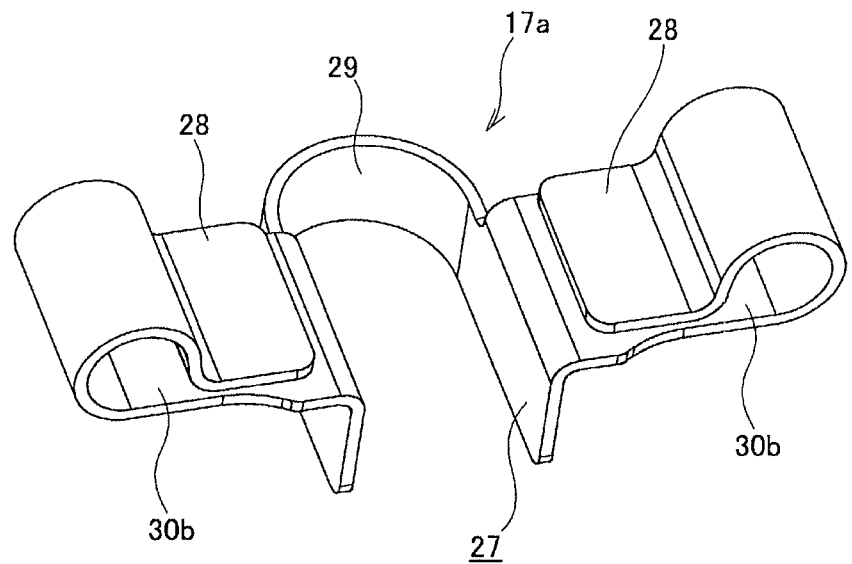
FIG. 19A is a perspective view of a clip according to a second embodiment of the invention, which is seen from the inner side.
Figure 19B:
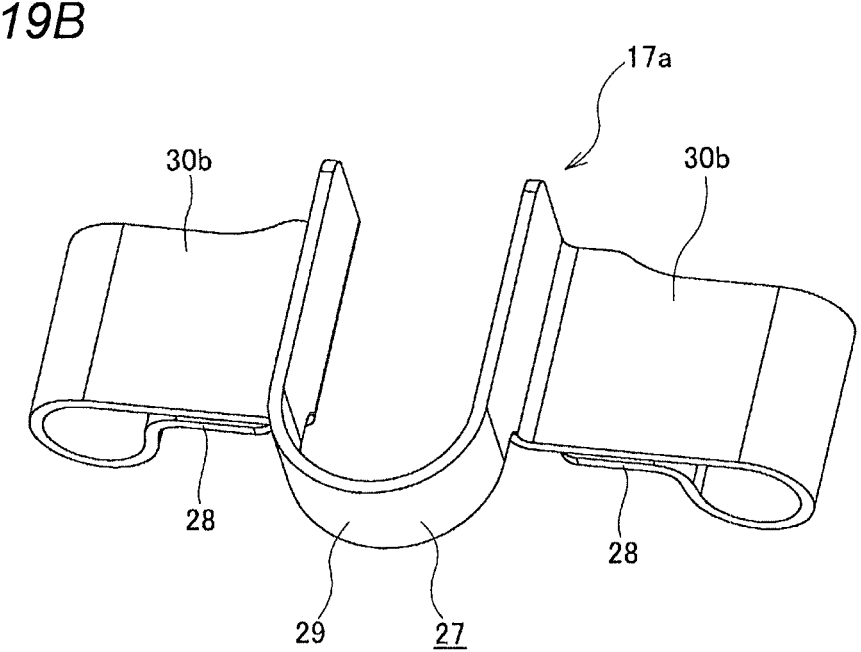
FIG. 19B is a perspective view of the clip according to the second embodiment of the invention, which is seen from the outer side.
Figure 20A:
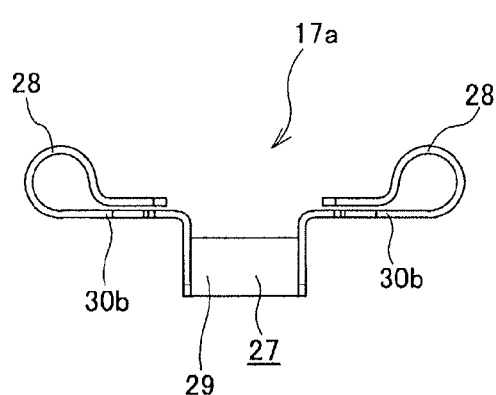
FIG. 20A is an orthographic view of the clip according to the second embodiment of the invention, which is seen from a radially outer side.
Figure 20B:
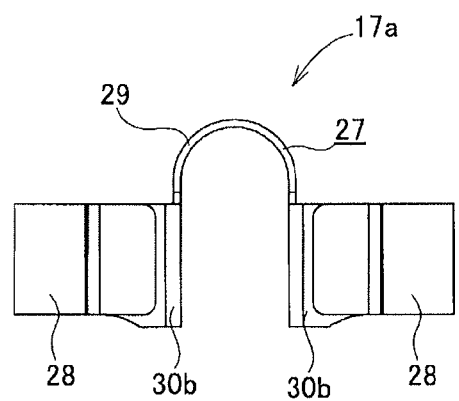
FIG. 20B is an orthographic view of the clip seen from the inner side.
Figure 20C:
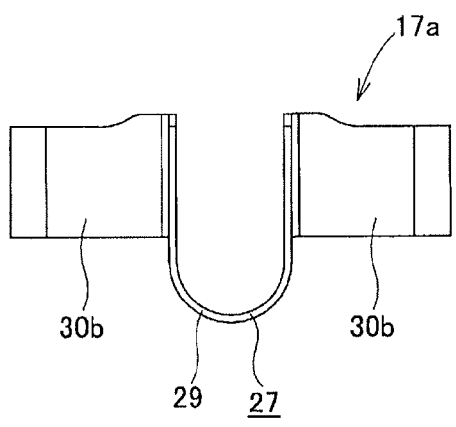
FIG. 20C is an orthographic view of the clip seen from the outer side and FIG. 20D is an orthographic view of the clip seen from the circumferential direction.
Figure 20D:
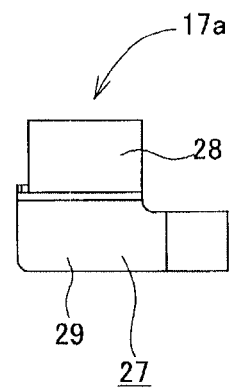
Figure 21A:
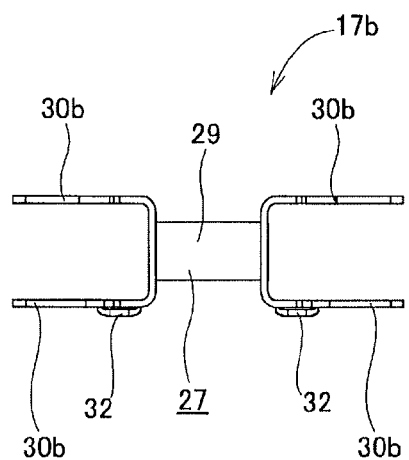
FIG. 21A is an orthographic view of a clip according to a reference example, which is seen from the radially outer side.
Figure 21B:
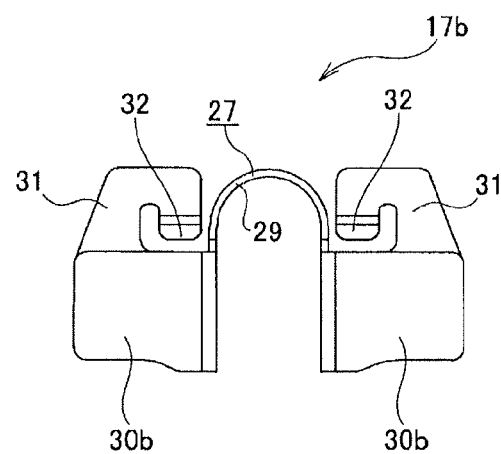
FIG. 21B is an orthographic view of the clip seen from the inner side.
Figure 21C:
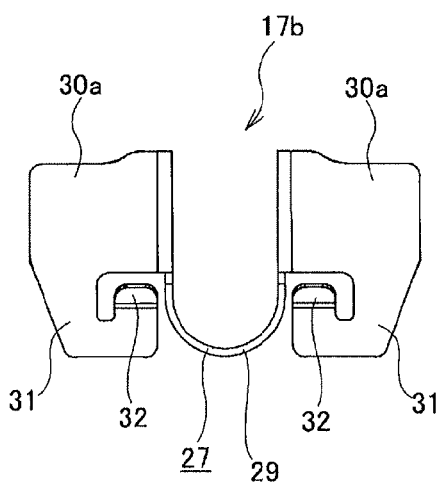
FIG. 21C is an orthographic view of the clip seen from the outer side and FIG. 21D is an orthographic view of the clip seen from the circumferential direction.
Figure 21D:
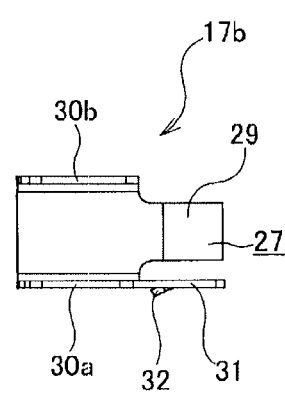

FIGS. 19 and 20 show a second embodiment of the present invention. A clip 17a for the composite disc rotor of this embodiment includes a pair of pressing portions 30b that is formed only at one axial edge of the connection portion 29, excluding the pressing portions 30a from the clip 17 of the first embodiment refer to FIGS. 10 and 18). Also, a pair of spring parts 28 is provided which continues from tip edges of both the pressing portions 30b. In a state where the composite disc rotor 1 includes the clips 17a, both the pressing portions 30b are contacted to one axial surface (inner surface) of both circumferential sides of each notch 15 (for example, refer to FIGS. 8, 9, 14 and 16) of the coupling bracket 3.

According to the structure of the second embodiment, unlike the clip 17 of the first embodiment, it is not necessary to strictly match the interval between the outer pressing portions 30a and the inner pressing portions 30b and the thickness T (refer to FIG. 3) of the part of the coupling bracket 3 where the notches 15 are formed. That is, when the interval is larger than the thickness T, the coupling bracket 3 rattles between the respective pressing plates 30a. On the other hand, when the interval is smaller than the thickness T, it is difficult to mount the clips 17 to the respective notches 15. Compared to this, when the clip 17a of this embodiment is used, the coupling part 6 (refer to FIGS. 1 and 2) of the coupling bracket 3 and the disc main body 2 does not rattle even when the size precision is not strictly regulated.

Also, although not shown, it may be possible to provide the clip 17a shown in FIGS. 19 and 20 with the same engaging parts 32 (for example, refer to FIGS. 10 and 18) as those of the clip 17 of the first embodiment by extending the pressing portions 30b, 30b.

Since the other configurations and operations are the same as those of the first embodiment, except for the shape of the clip 17a, the overlapping illustration and description are omitted.

According to the invention configured as described above, it is possible to provide a composite disc rotor capable of securing sufficient durability and reliability and reducing the number of parts while suppressing the manufacturing costs of respective parts, thereby reducing the cost thereof.

First, according to the composite disc rotor of the invention, the disc main body and the coupling bracket can be coupled by each coupling unit so that the brake torque can be transmitted and the disc main body and the coupling bracket can be slightly relatively displaced based on the moment. Hence, it is possible to prevent the excessive force from being applied to the respective coupling units by the moment that is applied upon the braking and to secure the reliability and durability of the composite disc rotor having the respective coupling units incorporated thereto.

Also, according to the composite disc rotor of the invention, the respective coupling units do not have a part whose material yield is poor and manufacturing cost is high, such as a circular ring-shaped plate spring disclosed in Patent Document 5. Also, since each clip is provided with the spacer portion and the spring part, it is possible to reduce the number of parts and to thus reduce the cost, which results from the easiness of the part manufacturing, the part management and the assembling operation.

The features of the invention are the structure of each coupling unit for coupling the disc main body and the coupling bracket, which are separately configured. The materials and shapes of the disc main body and the coupling bracket are not limited to the shown structures and the various materials and shapes can be adopted.

Also, if it doesn't care that the coupling part (refer to FIGS. 1 and 2, for example) of the coupling bracket 3 and the disc main body 2 slightly rattle, it may be possible to configure the composite disc rotor by using a clip 17b that has the engaging parts 32 for preventing the diametrical deviation but does not have the spring parts 28 (for example, refer to FIGS. 10 and 18) for preventing the rattling.

What is claimed is:

1. A composite disc rotor comprising:
a disc main body, having a ring shape, having a pair of friction surfaces which are opposite each other in an axial direction of the disc main body and to which pads are pushed upon braking, including a plurality of coupling portions at a plurality of circumferential positions of the disc main body, each of the coupling portions being disposed at an inner side in a radial direction of the disc main body and being formed with a coupling through hole;
a coupling bracket, having a plurality of notches which are opened in an outer peripheral edge of the coupling bracket and disposed at the plurality of circumferential positions; and
a plurality of coupling units, disposed at the plurality of circumferential positions, and each of which includes a bobbin including a head part and a pipe part, a clip and a coupling bolt, wherein
the head part includes a torque receiving portion inserted in each of the notches and a projection projected in a circumferential direction of the disc main body from an end of the torque receiving portion in the axial direction,
the pipe part is extended from the head part and is fitted in the coupling through hole,
each of the bobbins is formed with a through hole penetrating the head part and the pipe part,
each of the clips includes a connecting portion which is located between the torque receiving portion and an inner surface of each of the notches and two pressing portions which are extended from the connecting portion in the circumferential direction and located between the head part and the coupling bracket,
each of the coupling bolts is inserted into each of the through holes of the bobbins to fix the coupling bracket to the coupling unit, so that a torque applied to the friction surfaces is transmitted to the coupling bracket via the bobbin,
each of the pressing portions includes a spring portion that extends from a tip edge of the pressing portion, the spring portion having a tip end direct to the head part of the bobbin, and is provided between the projection and the coupling bracket so as to urge the projection away from the coupling bracket in the axial direction, and
the pressing portions are only extended from an edge of the connection portion at a side of the head part in the axial direction such that an edge of the connection portion at a side of the pipe part in the axial direction does not include pressing portions.

2. The composite disc rotor according to claim 1, wherein
the connection portion surrounds three sides of the torque receiving portion of each bobbin and has a folded-back shape,
the pressing portions are extended from opposed positions of the connection portion, which are bent from the edge of the connection portion to an opposite side to the torque receiving portion, and
a part of each of the pressing portions is contacted to both circumferential side portions of each of the notches.

3. The composite disc rotor according to claim 2, wherein
the spring portions are formed by folding back the tip ends of the pair of the pressing portions which are extended from the edge of the connection portion at the side of the head part in the axial direction, toward the head part, and
the spring portions are held between the head part and the pressing portions with being elastically compressed in the axial direction.

4. The composite disc rotor according to claim 2, wherein
the respective pressing portions are extended from two positions of the connecting portion,
the two positions are the opposed positions of the connection portion in the edge thereof at the side of the head part in the axial direction, and
both the pressing portions are contacted to one axial surface of both circumferential sides of each notch.

5. The composite disc rotor according to claim 1, wherein
each of the clips is integrally formed of a metal sheet having a resilience and corrosion resistance.

6. The composite disc rotor according to claim 1, wherein
at least a part of an inner surface of each of the through holes of the bobbins is formed with a female screw, and
each of the coupling bolts is screwed with the female screw.

* * * * *